United States Patent
Kurata et al.

(10) Patent No.: US 9,163,669 B2
(45) Date of Patent: Oct. 20, 2015

(54) SLIDING MEMBER AND BEARING

(75) Inventors: Ryoichi Kurata, Tochigi (JP); Kenzo Tadokoro, Tochigi (JP); Kazushige Kumagai, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 14/122,658

(22) PCT Filed: Dec. 22, 2011

(86) PCT No.: PCT/JP2011/079898
§ 371 (c)(1),
(2), (4) Date: Nov. 26, 2013

(87) PCT Pub. No.: WO2013/094064
PCT Pub. Date: Jun. 27, 2013

(65) Prior Publication Data
US 2014/0099048 A1    Apr. 10, 2014

(51) Int. Cl.
*B22F 7/04*     (2006.01)
*F16C 33/06*    (2006.01)
(Continued)

(52) U.S. Cl.
CPC .................. *F16C 33/145* (2013.01); *B22F 7/02* (2013.01); *B22F 7/04* (2013.01); *F16C 17/02* (2013.01); *F16C 33/20* (2013.01); *F16C 33/201* (2013.01);
(Continued)

(58) Field of Classification Search
USPC .......................................... 428/550; 508/103
See application file for complete search history.

(56) References Cited

U.S. PATENT DOCUMENTS 3,305,325 A    2/1967   Le Brasse et al.
4,208,472 A *  6/1980   Cho et al. ...................... 428/550
(Continued)

FOREIGN PATENT DOCUMENTS

CD    102131688 A    7/2011
CN      1806131 A    7/2006
(Continued)

OTHER PUBLICATIONS

Japanese Patent Office, International Search Report for PCT/JP2011/079898, completed Feb. 27, 2012, mailed Mar. 6, 2012, 2 pages.
(Continued)

*Primary Examiner* — George Wyszomierski
*Assistant Examiner* — Ngoclan T Mai
(74) *Attorney, Agent, or Firm* — Chernoff, Vilhauer, McClung & Stenzel LLP

(57) ABSTRACT

To provide a sliding member that improves seizure resistance by restraining any exposure of the porous layer and improves abrasion resistance and load resistance.
The sliding member 1 constitutes a bearing having a cylindrical shape, an inner circumferential surface of which is a sliding layer 5 with an axis. In the sliding member 1, a porous layer 3 made of alloy material is formed on a surface of a metal base 2 and this porous layer 3 is covered by resin material 4 so that the sliding layer 5 is formed. In the sliding member 1, a particle size of metal powder 30 forming the porous layer 3 is within a range of 15 through 60 μm, preferably, about 25 through 45 μm. Further, in the sliding member 1, a thickness of the porous layer 3 is within a range of 0.06 through 0.1 mm and a thickness of the sliding layer 5 is within a range of 0.08 through 0.16 mm The thickness of the sliding layer 5 is set to be thicker on average than the thickness of the porous layer 3 so that the porous layer 3 is not exposed.

5 Claims, 2 Drawing Sheets

(51) Int. Cl.
- *F16C 33/14* (2006.01)
- *B22F 7/02* (2006.01)
- *F16C 17/02* (2006.01)
- *F16C 33/20* (2006.01)
- *F16C 31/02* (2006.01)

(52) U.S. Cl.
CPC ............ *F16C 33/206* (2013.01); *F16C 33/208* (2013.01); *F16C 31/02* (2013.01); *F16C 2202/52* (2013.01); *F16C 2202/54* (2013.01); *F16C 2204/12* (2013.01); *F16C 2208/02* (2013.01); *F16C 2208/32* (2013.01); *F16C 2220/20* (2013.01); *F16C 2240/48* (2013.01); *F16C 2240/60* (2013.01)

(56) References Cited

U.S. PATENT DOCUMENTS

| | | | |
|---|---|---|---|
| 4,666,787 A * | 5/1987 | Bickle et al. | 428/550 |
| 5,433,870 A | 7/1995 | Nakamaru et al. | |
| 5,624,887 A | 4/1997 | Nakamaru et al. | |
| 6,498,127 B1 * | 12/2002 | Niwa et al. | 508/104 |
| 6,981,798 B2 * | 1/2006 | Katagiri et al. | 384/294 |
| 7,670,055 B2 | 3/2010 | Egami et al. | |
| 2006/0251348 A1 | 11/2006 | Egami et al. | |
| 2011/0148064 A1 | 6/2011 | Yanase et al. | |

FOREIGN PATENT DOCUMENTS

| | | |
|---|---|---|
| EP | 0 590 488 A1 | 4/1994 |
| JP | 06-200280 | 7/1994 |
| JP | 2004-176757 | 6/2004 |
| JP | 2006-226299 | 8/2006 |
| JP | 2008-261374 | 10/2008 |

OTHER PUBLICATIONS

The State Intellectual Property Office of P.R. China, Notification of First Office Action in application No. 201180068953.6, Jun. 13, 2014, 5 pages, Beijing, China (translation included).

Extended search report for corresponding European patent application No. 11877767.1, dated Apr. 1, 2015, 7 pgs.

* cited by examiner

SLIDING MEMBER AND BEARING

CROSS-REFERENCE TO RELATED APPLICATION

This is a national stage application filed under 35 USC 371 based on International Application No. PCT/JP2011/079898 filed Dec. 22, 2011.

TECHNICAL FIELD

The present invention relates to a sliding member that is used in a bearing which supports an axis so as to be slidable and the bearing.

BACKGROUND

As the sliding member, a sliding material in which Cu—Sn alloy has been bonded to a steel plate has been often used. The previously used Cu—Sn alloy has been Cu—Sn—Pb alloy in which an addition of Pb has allowed an excellent sliding to be maintained.

However, the use of Pb has been limited in various kinds of fields in recent years because Pb has any quality of being noxious to human body and Pb-free material has been proposed in the sliding member. As such Pb-free sliding material, a sliding member in which a resin material has been used has been proposed (see, for example, Patent Document 1).

The previous sliding member using the resin material has had a configuration such that a porous Cu—Sn alloy layer has formed on the steel plate and polytetrafluoroethylene (PTFE) as the resin material has been impregnated into this porous layer and coated thereon. The porous layer has been so that powders of Cu—Sn alloy have been dispersed on the steel plate and the steel plate on which the powders of Cu—Sn alloy have dispersed has been sintered in a sintering furnace, thereby enabling a porous Cu—Sn alloy layer to be formed on the steel plate.

DOCUMENTS FOR PRIOR ART

Patent Documents

Patent Document 1: Japanese Patent Application Publication No. 2006-226299

SUMMARY OF THE INVENTION

Problems to be Solved by the Invention

As before, a particle size of metal powder forming the porous layer has been almost within a range of about 75 through 150 μm. On the other hand, a thickness of a sliding layer has been within a range of about 0.2 through 0.4 mm. The particle size of metal powder forming the porous layer has been larger in proportion to the thickness of the sliding layer and a variation of the particle sizes has been also severe so that the sliding layer has been thicker in proportion to that of the sliding layer and an amount of abrasion of the sliding layer to be allowed until the porous layer has been exposed up to a surface of the sliding layer has been small.

The sliding member, the sliding layer of which has been made of resin material, has been applied to a bearing which has been used under an oil lubricious condition but a case in which the bearing runs short of an oil film temporarily may occur. In the bearing to which the sliding member in which the sliding layer has been made of resin material is applied, even if the bearing runs short of an oil film on the surface of the sliding layer temporarily, the resin material forming the sliding layer bears its role as a lubricant.

When, however, the amount of abrasion of the sliding layer to be allowed until the porous layer has been exposed up to the surface of the sliding layer has been small, a phenomenon called as "dry touch" occurs such that an axis or the like to be a target for sliding contacts the porous layer in a condition of being short of the oil film. If the "dry touch" occurs, any seizure of the bearing and the axis, any damage to the axis or the like may be generated.

This invention has solved such problems and has an object to provide a sliding member which improves seizure resistance by restraining any exposure of the porous layer and improves abrasion resistance and load resistance and to provide a bearing using this sliding member.

Means for Solving the Problems

Inventors have found out that reducing the particle size of metal powder forming the porous layer allows seizure resistance to be improved by restraining any exposure of the porous layer and allows load resistance to be improved. They have also found out that reducing the thickness of the sliding layer allows abrasion resistance to be improved.

Accordingly, this invention relates to a sliding member in which on a surface of a metal base, a porous layer is formed by sintering metal powder and a sliding layer is formed by baking resin material impregnated into the porous layer, in which a particle size of the metal powder is within a range of 15 through 60 μm; a thickness of the sliding layer is within a range of 0.08 through 0.16 mm; and a thickness of the porous layer is within a range of 0.06 through 0.1 mm and is thinner than the thickness of the sliding layer on average.

Further, this invention relates to a bearing configured to form a bearing member in which on a surface of a metal base, a porous layer is formed by sintering metal powder and a sliding layer is formed by baking resin material impregnated into the porous layer, to an annular shape with the sliding layer facing inside so that a cylindrical inner circumference surface is the sliding layer, in which a particle size of the metal powder is within a range of 15 through 60 μm; a thickness of the sliding layer is within a range of 0.08 through 0.16 mm; and a thickness of the porous layer is within a range of 0.06 through 0.1 mm and is thinner than the thickness of the sliding layer on average.

It is preferable that the particle size of the metal powder is within a range of 25 through 45 μm. It is also preferable that a thickness of the porous layer is within a range of 0.06 through 0.1 mm and is configured so as to be thinner than the thickness of the sliding layer on average.

Effects of the Invention

According to the invention, by miniaturizing the particle size of the metal powder forming the porous layer, it is possible to restrain any exposure of the porous layer to improve the seizure resistance. It is also possible to improve strength of the porous layer to restrain any deformation of the porous layer and to restrain any deformation of the resin material entered into the porous layer to improve the load resistance.

Further, by miniaturizing the particle size of the metal powder forming the porous layer, it is possible to restrain any exposure of the porous layer even when thinning down the thickness of the sliding layer and by thinning down the thickness of the sliding layer, it is possible to restrain any deformation of the sliding layer, to restrain any abrasion accompanying with the deformation of the sliding layer and to improve the abrasion resistance.

EMBODIMENT FOR IMPLEMENTING THE INVENTION

The following will describe an embodiment of the sliding member according to this invention and an embodiment of the bearing to which the sliding member according to this invention is applied, with reference to drawings.

Configuration Example of Sliding Member according to the Embodiment

Figure 1:
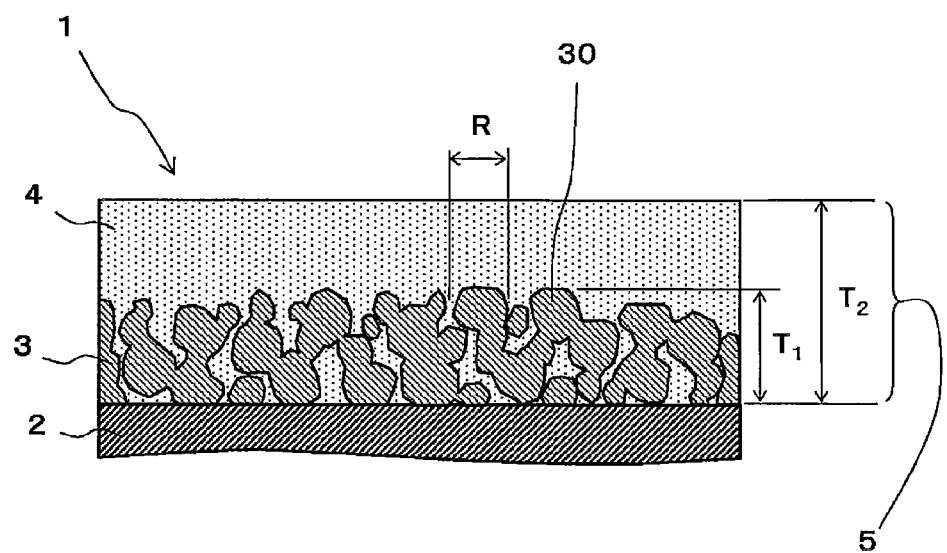
FIG. 1 is a cross sectional systematic diagram of a sliding member according to this embodiment for showing an example thereof.

FIG. 1 is a cross sectional systematic diagram of a sliding member according to this embodiment for showing an example thereof. In the sliding member 1 according to this embodiment, a porous layer 3 made of alloy material is formed on a surface of a metal base 2, which is one surface thereof, and this porous layer 3 is covered by resin material 4 so that the sliding layer 5 is formed.

The porous layer 3 is formed by sintering metal powder 30 on the surface of the metal base 2 so as to have a predetermined thickness. In this embodiment, as the metal powder 30, powders of Cu—Sn alloy are dispersed on a copper plating steel plate, which is the metal base 2, and the copper plating steel plate on which the powders of Cu—Sn alloy are dispersed is sintered in a sintering furnace so that a porous Cu—Sn alloy layer 3 is formed on the copper plating steel plate.

The sliding layer 5 is formed by impregnating the resin material 4 into the porous layer 3 which has been formed on the surface of the metal base 2 so that the resin material 4 has a predetermined thickness, and baking the resin material 4 impregnated into the porous layer 3. In this embodiment, the resin material 4 is manufactured by mixing PTFE dispersion as a main ingredient of resin material, and a filler of molybdenum disulfide, graphite, carbon fiber and the like, adding organic solvent thereto, and stirring them. The resin material 4 is mounted on the porous layer 3 of the surface of the metal base 2 and pressed thereon so that it is impregnated into the porous layer 3. It is heated to a melting point of PTFE or more and baked in the baking furnace.

In the sliding member 1, by miniaturizing the particle size of the metal powder 30 forming the porous layer 3 as compared with the previous one, the thickness of the porous layer 3 is reduced as compared with the previous one to restrain any exposure of the porous layer 3, which causes the "dry touch", and the thickness of the sliding layer 5 is reduced as compared with the previous one to plan for improvement of abrasion resistance.

The porous member 3 has a particle size R of the metal powder 30 that is within a range of 15 μm through 60 μm, preferably, about 25 μm through 45 μm. In the past, the particle size of the metal powder has been within a range of about 75 μm through 150 μm in which the particle size thereof has been large and the particle sizes have been widely varied.

On the other hand, in this embodiment, the particle size of the metal powder 30 is small and is restrained to a small variation in the particle sizes.

The sliding member 1 is set so that a thickness $T_1$ of the porous layer 3 is within a range of 0.06 mm through 0.1 mm. The thickness of the porous layer 3 is set to have a thickness such that at least two powders of the metal powder 30 are laid on a top of each other.

The sliding member 1 is set so that a thickness $T_2$ of the sliding layer 5 is within a range of 0.08 mm through 0.16 mm. The thickness of the sliding layer 5 is set to be thicker on average than the thickness of the porous layer 3 so that the porous layer 3 is not exposed. In the past, the thickness of the sliding layer has been within a range of about 0.2 mm through 0.4 mm and the particle size of the metal powder forming the porous layer has been within a range of about 75 μm through 150 μm and the particle sizes have been widely varied so that the porous layer has been thicker in proportion to the sliding layer and an amount of abrasion of the sliding layer to be allowed until the porous layer has been exposed up to a surface of the sliding layer has been small.

On the other hand, in this embodiment, the thickness $T_2$ of sliding layer 5 is set so as to be within a range of about 0.08 through 0.16 mm and is configured to be thinner as compared with the previous one but by setting the particle size R of the metal powder 30 so that it is within a range of 15 through 60 μm, preferably, about 25 through 45 μm, the thickness $T_1$ of the porous layer 3 can be within a range of about 0.06 through 0.1 mm so that the amount of abrasion of the sliding layer 5 to be allowed until the porous layer 3 has been exposed is increased.

Configuration Example of Bearing according to this Embodiment

Figure 2:
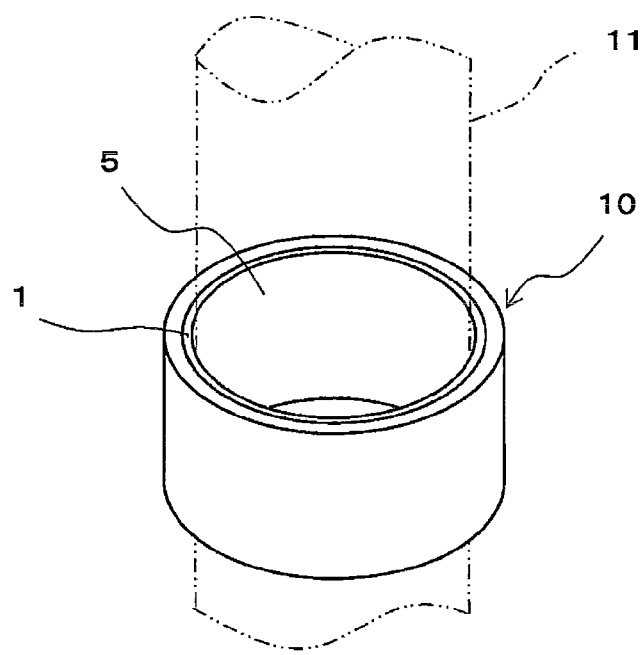
FIG. 2 is a perspective view of a bearing according to this embodiment for showing an example thereof.

FIG. 2 is a perspective view of a bearing according to this embodiment for showing an example thereof. The bearing 10 of this embodiment is configured so that the sliding member 1 described on FIG. 1 is formed to an annular shape with the sliding layer 5 facing inside. The bearing 10 supports an axis 11 by the sliding layer 5 forming the cylindrical inner circumferential surface. The bearing 10 is applicable to any of cases where the axis performs rotary motion and the axis performs linear motion.

The bearing 10 of this embodiment is available for a sliding portion such as a shock absorber of a motor vehicle or the like, in which oil is used under the condition of performing the linear motion thereof. Further, it is available for a sliding portion such as a gear pump which sends out oil by rotating toothed wheel members, in which the oil is used under the condition of performing the rotary motion thereof.

Example of Effects of Sliding Member and Bearing according to this Embodiment

In the bearing 10, the axis 11 performs the rotary motion or the linear motion so that the axis 11 is slid with the axis 11 coming into contact with a part of the surface of the sliding layer 5. In the sliding member 1 configuring the bearing 10, as described above, the particle size R of the metal powder 30 forming the porous layer 3 is within a range of about 25 through 45 μm, which is miniaturizes as compared with the previous one.

Accordingly, it is possible to reduce the thickness $T_1$ of the porous layer 3 to be within a range of about 0.06 through 0.1 mm. Even when configuring such that the thickness $T_2$ of sliding layer 5 is set so as to be within a range of about 0.08 through 0.16 mm and configuring to be thinner as compared with the previous one, it is possible to increase the amount of abrasion of the sliding layer 5 to be allowed until the porous layer 3 is exposed up to the surface of the sliding layer 5.

Accordingly, by sliding the axis 11 on the sliding layer 5, even if the resin material 4 forming the sliding layer 5 is worn, the exposure of the porous layer 3 is restrained and it is possible to restrain any "dry touch" which is a primary factor of seizure of the porous layer 3 and the axis 11 when they have been directly contacted with each other.

The bearing 10 is used under an oil lubricious condition but a case in which the bearing runs short of an oil film temporarily may occur. Even when the bearing 10 runs short of the oil film on the surface of the sliding layer 5, the resin material 4 forming the sliding layer 5 bears its role as a lubricant.

As described above, even when the bearing 10 runs short of the oil film, since the exposure of the porous layer 3, which causes the "dry touch", is restrained, it is possible to improve the seizure resistance as compared with the past bearing in which the sliding layer is made of resin material so that the seizure resistance which is the same level as that of the bearing using the sliding material including Pb is obtained under a configuration excluding Pb.

Further, by reducing the thickness of the sliding layer 5, it is possible to restrain any deformation of the sliding layer 5 based on that the axis 11 is slid on the sliding layer 5 and to restrain the abrasion accompanying with the deformation of the sliding layer 5. Even when reducing the thickness of the sliding layer 5, it is possible to obtain the abrasion resistance which is the same level, as compared with the past bearing in which the sliding layer is made of resin material.

Additionally, when a particle size of the metal powder 30 is reduced to be 25 μm or less on average, an intermediate gap between the metal powders is reduced when forming the porous layer 3 so that it is difficult to enter the resin material 4 into the porous layer 3. On the other hand, when the particle size R of the metal powder 30 is within a range of about 25 through 45 the resin material 4 which is impregnated into the porous layer 3 formed by the metal powder 30 and is baked enters into the porous layer 3. This allows so-called anchor effect to be obtained and allows to be obtained resin contact ability which is the same level, as compared with the past bearing in which the porous layer is made of metal powder having the particle size with the past particle size thereof, thereby restraining the sliding layer 5 from being peeled off the metal base 2.

Figure 3:
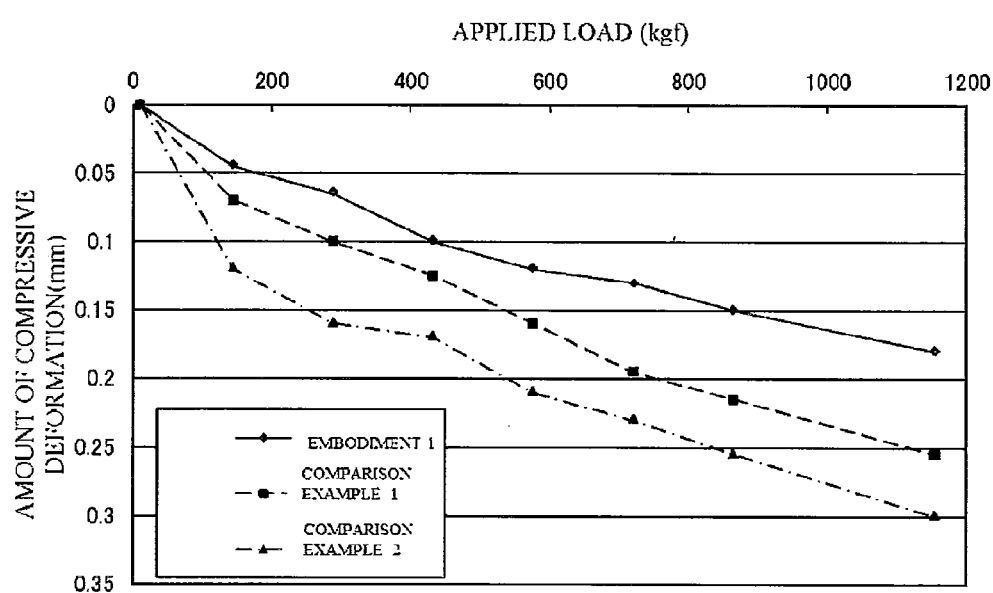
FIG. 3 is a graph for showing a relationship between applied load and an amount of compressive deformation.

Further, by setting the particle size R of the metal powder 30 forming the porous layer 3 to be within a range of about 25 through 45 μm, its load resistance is improved even when reducing the thickness $T_2$ of the sliding layer 5 to be within a range of about 0.08 through 0.16 mm. FIG. 3 is a graph for showing a relationship between applied load and an amount of compressive deformation.

In the graph of FIG. 3, an embodiment 1 shown in a solid line indicates the sliding member to which this invention is applied, in which the particle size R of the metal powder 30 forming the porous layer 3 is within a range of 25 through 45 μm and the thickness of whole of the sliding member 1 is 1 mm and the thickness of the metal base 2 is 0.9 mm so that the thickness $T_2$ of the sliding layer 5 is within a range of about 0.08 through 0.16 mm.

In a comparison example 1 shown in a broken line, the particle size of the metal powder forming the porous layer is within a range of 75 through 150 μm and the thickness of whole of the sliding member is 1.0 mm and the thickness of the metal base is 0.75 mm so that the thickness of the sliding layer is within a range of about 0.2 through 0.4 mm. In a comparison example 2 shown in an alternate long and short dash line, the thickness of whole of the sliding member is 2.0 mm and the thickness of the metal base is 1.8 mm under the same condition as the comparison example 1 in order to measure a difference in the thickness of the metal base.

As shown in the graph of FIG. 3, in the embodiment 1, it is understood that an amount of compressive deformation of the sliding layer against the load is smaller than those of the comparison examples 1 and 2. When comparing the comparison example 1 with the comparison example 2, there is a tendency such that the thinner the thickness of the metal base, the smaller the amount of compressive deformation in the sliding layer.

Further, when the particle size R of the metal powder 30 forming the porous layer 3 is set to be within a range of 25 through 45 μm, a density of the metal powder 30 is increased in the porous layer 3 as compared with respective comparison examples, so that the deformation of the porous layer 3 and the deformation of the resin material 4 entered into the porous layer 3 are restrained, thereby improving the load resistance. Accordingly, it is possible to use the same under high load condition.

INDUSTRIAL APPLICABILITY

This invention is applied to a sliding member that is used under a condition in which oil is supplied thereto and a bearing.

EXPLANATION OF REFERENCE NUMBERS

1: Sliding Member
10: Bearing
2: Metal Base
3: Porous Layer
30: Metal Powder
4: Resin Material
5: Sliding Layer

The invention claimed is:

1. A sliding member having a metal base, and a porous layer disposed on said metal base, were said porous layer comprises sintered metal powder, where said sliding member further comprises a sliding layer of baked resin material impregnated into the porous layer, and where the metal powder comprises a plurality of particles, every particle in said porous layer having a size prior to sintering limited to within a range of 15 μm through 60 μm; where
  a thickness of the sliding layer is within a range of 0.08 mm through 0.16 mm;
  and
  a thickness of the porous layer is within a range of 0.06 mm through 0.1 mm and is thinner than the thickness of the sliding layer on average; and where said resin material excludes lead.

2. The sliding, member according to claim 1, where every said particle in said porous layer has a size prior to sintering limited to within a range of 25 μm through 45 μm.

3. A bearing member having a metal base, and a porous layer disposed on said metal base, where said porous layer comprises sintered metal powder, where said bearing member further comprises a sliding layer of baked resin material impregnated into the porous layer, where the bearing member has an annular shape with the sliding member facing inwards so that a cylindrical inner circumference surface of the bearing member is the sliding layer, where the metal powder comprises a plurality of particles, every particle in said porous layer having a size prior to sintering limited to within a range of 15 μm through 60 μm; where
- a thickness of the sliding, layer is within a range of 0.08 mm through 0.16 mm; and
- a thickness of the porous layer is within a range of 0.06 mm through 0.1 mm and is thinner than the thickness of the sliding layer on average; and where said resin material excludes lead.

4. The bearing member according to claim 3, where every said particle in said porous layer has a size prior to sintering limited to within a range of 25 μm through 45 μm.

5. A method of forming a sliding member having a metal base, and a porous layer of sintered metal powder disposed on said metal base, said porous layer having a first thickness limited to within a range of 0.06 mm to 0.1 mm, and a sliding layer having a second thickness more than the first thickness on average and being limited to within a range of 0.08 mm through 0.16 mm, said method comprising:
- (a) forming said porous layer by sintering metal powder on said metal base, said sintered powder comprising a plurality of particles, every particle in said porous layer having a size prior to sintering limited to within a range of 15 μm through 60 μm; and
- (b) impregnating said porous layer with a sliding layer of baked resin material, such that said porous layer is a part of said sliding layer where said resin material excludes Pb.

\* \* \* \* \*